(12) United States Patent
Dai et al.

(10) Patent No.: US 10,234,923 B2
(45) Date of Patent: Mar. 19, 2019

(54) METHODS AND DEVICES FOR WAKING UP A SCREEN

(71) Applicant: XIAOMI INC., Haidian District, Beijing (CN)

(72) Inventors: Lin Dai, Beijing (CN); Yanjun Kang, Beijing (CN); Dawei Xiong, Beijing (CN)

(73) Assignee: XIAOMI INC., Beijing (CN)

( * ) Notice: Subject to any disclaimer, the term of this patent is extended or adjusted under 35 U.S.C. 154(b) by 156 days.

(21) Appl. No.: 15/377,637

(22) Filed: Dec. 13, 2016

(65) Prior Publication Data

US 2017/0168543 A1 Jun. 15, 2017

(30) Foreign Application Priority Data

Dec. 15, 2015 (CN) .......................... 2015 1 0934800

(51) Int. Cl.
*G06F 9/00* (2006.01)
*G06F 1/3206* (2019.01)
(Continued)

(52) U.S. Cl.
CPC .......... *G06F 1/3206* (2013.01); *G06F 1/1626* (2013.01); *G06F 1/3231* (2013.01);
(Continued)

(58) Field of Classification Search
CPC .... G06F 1/3206; G06F 1/1626; G06F 1/3231; G06F 1/3265; G06F 3/00; G06F 3/011; G06F 3/015
(Continued)

(56) References Cited

U.S. PATENT DOCUMENTS

| 2002/0080132 A1* | 6/2002 | Dai ........................ | G06F 1/3203 345/212 |
|---|---|---|---|
| 2004/0181702 A1* | 9/2004 | Cheng ................... | G06F 1/3203 713/320 |

(Continued)

FOREIGN PATENT DOCUMENTS

| CN | 103294583 A | 9/2013 |
|---|---|---|
| CN | 103312874 A | 9/2013 |

(Continued)

OTHER PUBLICATIONS

International Search Report issued in corresponding International Application No. PCT/CN2016/101457, dated Jan. 5, 2017, 5 pages.
(Continued)

*Primary Examiner* — Aurel Prifti
(74) *Attorney, Agent, or Firm* — Arch & Lake LLP

(57) ABSTRACT

Methods and devices are provided for waking up a screen in the field of application of electronic technologies. The method may be implemented by a device including a screen and a frame at least partially surrounding the screen. In the method, the device activates at least one temperature transducer according to a predetermined sequence when the screen is in an off state, where the at least one temperature transducer is disposed at least partially in the frame. The device may obtain a temperature measurement through the activated temperature transducer. When any one of the temperature measurement is within a preset range of temperature, the device may trigger the screen to be switched from the off state to an on state.

18 Claims, 10 Drawing Sheets

(51) Int. Cl.
*G06F 1/3234* (2019.01)
*G06F 3/01* (2006.01)
*G06F 1/16* (2006.01)
*G06F 1/3231* (2019.01)
*G06F 3/00* (2006.01)

(52) U.S. Cl.
CPC .............. *G06F 1/3265* (2013.01); *G06F 3/00* (2013.01); *G06F 3/011* (2013.01); *G06F 3/015* (2013.01); *Y02B 60/1242* (2013.01); *Y02B 60/1289* (2013.01); *Y02D 10/153* (2018.01); *Y02D 10/173* (2018.01)

(58) Field of Classification Search
USPC .......................... 715/863; 713/323, 320, 324
See application file for complete search history.

(56) References Cited

U.S. PATENT DOCUMENTS

| | | | |
|---|---|---|---|
| 2010/0105423 A1 | 4/2010 | Gupta | |
| 2010/0153764 A1* | 6/2010 | Pratt | G06F 1/3203 713/324 |
| 2010/0250985 A1* | 9/2010 | Gupta | G06F 1/3203 713/323 |
| 2011/0273378 A1* | 11/2011 | Alameh | H04M 1/72569 345/173 |
| 2012/0019495 A1* | 1/2012 | Chang | G09G 5/00 345/207 |
| 2012/0068952 A1* | 3/2012 | Slaby | G01K 7/02 345/173 |
| 2012/0147531 A1* | 6/2012 | Rabii | H04W 52/0254 361/679.01 |
| 2012/0249411 A1* | 10/2012 | Hu | G06F 1/3218 345/156 |
| 2014/0006830 A1* | 1/2014 | Kamhi | G06F 1/3287 713/324 |
| 2014/0059365 A1* | 2/2014 | Heo | G06F 1/3206 713/320 |
| 2014/0075211 A1* | 3/2014 | Kumar | G06F 1/266 713/300 |
| 2014/0157210 A1* | 6/2014 | Katz | G06F 3/017 715/863 |
| 2014/0306877 A1 | 10/2014 | Katz | |
| 2015/0058651 A1* | 2/2015 | Choi | G06F 1/3215 713/324 |
| 2016/0306435 A1 | 10/2016 | Katz et al. | |

FOREIGN PATENT DOCUMENTS

| | | |
|---|---|---|
| CN | 104301545 A | 1/2015 |
| CN | 104735233 A | 6/2015 |
| CN | 105511625 A | 4/2016 |
| EP | 2490101 A1 | 8/2012 |
| WO | 2013021385 A2 | 2/2013 |

OTHER PUBLICATIONS

The Written Opinion of the International Search Authority issued in corresponding International Application No. PCT/CN2016/101457, dated Jan. 5, 2017, 5 pages.

Supplementary European Search Report in European application No. 16204095.0, dated Jun. 2, 2017, 8 pages.

* cited by examiner

Fig. 1 activating, by a terminal comprising a screen and a frame at least partially surrounding the screen, at least one temperature transducer according to a predetermined sequence when the screen is in an off state, the at least one temperature transducer being disposed at least partially in the frame
101 obtaining, by the terminal, a temperature measurement through the activated temperature transducer
102 when the temperature measurement is within a preset range of temperature, triggering, by the terminal, the screen to be switched from the off state to an on state
103

Fig. 2A

A terminal divides at least two temperature transducers arranged in a frame of the terminal into at least two groups of temperature transducers, each group of temperature transducers including at least one temperature transducer
201

When a screen is in an off state, the terminal cyclically activates the at least two groups of temperature transducers in a predetermined sequence
202

The terminal performs temperature sensing through the activated temperature transducers
203

When any one of the activated temperature transducers senses temperature within a preset range of temperature of a human body, the terminal triggers the screen to be switched from the off state to an on state
204

The terminal receives information input by a user through the screen in the on state
205

Fig. 2H

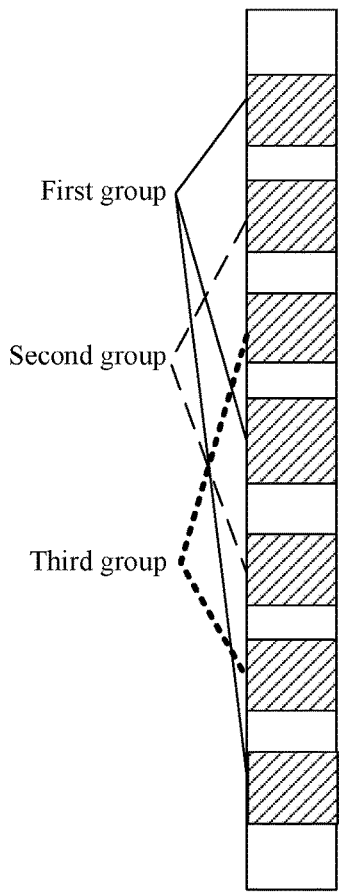

Fig. 2I

| When a screen is in an off state within a preset period of time, each of the temperature transducers arranged in a frame of a terminal is activated, wherein the off state occurs at least once within the preset period of time | 2016 |

↓

| A number of times for which each of the temperature transducers senses temperature within a preset range of temperature of a human body within the preset period of time are counted | 2017 |

↓

| The at least two temperature transducers arranged in the frame of the terminal are divided into at least two groups of temperature transducers with different priorities according to the number of times for which each of the temperature transducers senses temperature within the preset range of temperature of a human body, the priorities being directly proportional to the number of times for which the temperature transducers sense temperature within the preset range of temperature of a human body | 2018 |

METHODS AND DEVICES FOR WAKING UP A SCREEN

CROSS-REFERENCE TO RELATED APPLICATION

This application is filed based upon and claims priority to Chinese Patent Application No. 201510934800.5, filed on Dec. 15, 2015, the entire contents of which are incorporated herein by reference.

TECHNICAL FIELD

The embodiments of present disclosure generally relate to the field of application of electronic technologies, and more particularly, to a method and device for waking up a screen.

BACKGROUND

When a terminal such as a mobile phone is in a sleep state, that is, a screen of the terminal is in an off state, its screen is in a low-power-consumption mode. If the terminal is required to work normally, it is necessary to wake up the terminal to switch the terminal from the sleep state to a wakeup state.

In a related technology, a terminal may be waked up in various manners of gesture wakeup, password wakeup, trajectory wakeup or the like. In each of the wakeup manners, it is necessary to trigger a screen of the terminal to be switched from an off state to an on state, which is called a screen wakeup process. Only the screen in the on state may receive a gesture, password, trajectory or the like input by a user, thereby waking up the terminal.

SUMMARY

According to a first aspect of the present disclosure, there is provided a method for waking up a screen. The method may be implemented by a terminal including a screen and a frame at least partially surrounding the screen. In the method, the terminal activates at least one temperature transducer according to a predetermined sequence when the screen is in an off state, where the at least one temperature transducer is disposed at least partially in the frame. The terminal may obtain a temperature measurement through the activated temperature transducer. When any one of the temperature measurement is within a preset range of temperature, the terminal may trigger the screen to be switched from the off state to an on state.

According to a second aspect of the present disclosure, there is provided a device for waking up a screen. The device includes: a frame including at least one temperature transducer; a screen at least partially surrounded by the frame; a processor at least partially surrounded by the frame; and a memory configured to store instructions executable by the processor. The processor is configured to: activate the at least one temperature transducer in a predetermined sequence when the screen is in an off state; obtain a temperature measurement through the activated temperature transducer; and send an instruction to trigger the screen to be switched from the off state to an on state when the temperature measurement is within a preset range of temperature.

According to a third aspect of the present disclosure, a non-transitory computer-readable storage medium is provided to store instructions that, when executed by a processor of a mobile terminal, causes the mobile terminal to perform following acts: when the screen is in an off state, cyclically activating at least two groups of temperature transducers in a predetermined sequence, the at least two groups of temperature transducers are arranged in a frame of a terminal and each group of temperature transducers comprising at least one temperature transducer; obtaining at least one temperature measurement through the activated temperature transducers; and when the at least one temperature measurement is within a preset range of temperature, triggering the screen to be switched from the off state to an on state.

It is to be understood that the above general descriptions and detailed descriptions below are only exemplary and explanatory and not intended to limit the present disclosure.

BRIEF DESCRIPTION OF THE DRAWINGS

In order to describe embodiments of the present disclosure more clearly, the accompanying drawings required by descriptions about the embodiments will be simply introduced below. Apparently, the accompanying drawings described below are only some embodiments of the present disclosure, and those skilled in the art may further obtain other accompanying drawings according to these accompanying drawings without creative work.

FIG. 1 is a flow chart showing a method for waking up a screen, according to an exemplary embodiment;

FIG. 2A is a flow chart showing another method for waking up a screen, according to an exemplary embodiment;

FIG. 2H is another schematic view of dividing temperature transducers in a frame, according to an exemplary embodiment;

FIG. 2I is a flow chart showing a method for a terminal to divide at least two temperature transducers arranged in a frame of the terminal into at least two groups of temperature transducers, according to an exemplary embodiment;

Figure 2B:
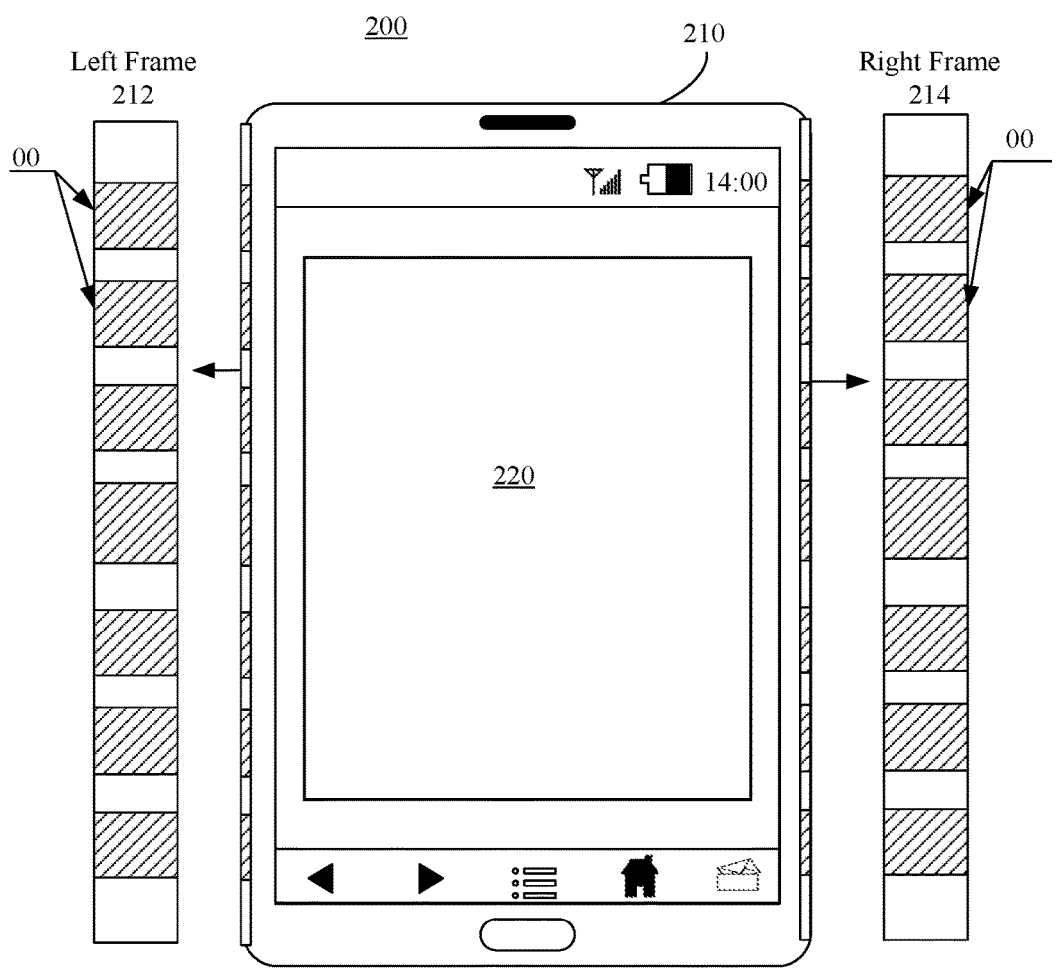
FIG. 2B is a schematic view of a structure of a terminal, according to an exemplary embodiment.

The abovementioned accompany drawings have shown specific embodiments of the present disclosure, and more detailed descriptions will be made hereinafter. These accompany drawings and text descriptions are intended not to limit the scope of the concept of the present disclosure in any manner but to describe the concept of the present disclosure to those skilled in the art with reference to specific embodiments.

DETAILED DESCRIPTION

The present disclosure provides a method for waking up a screen, or activating other biometric sensors. For example, a terminal may sense hand temperature of a user to trigger the terminal screen to be turned on. The terminal may obtain at least one temperature measurement through at least one temperature transducer at least partially disposed in a frame of the terminal. Specifically, a plurality of temperature transducers may be arranged in left and right frames in the frame of the terminal. When a screen is in an off state, the terminal may only activate a subset of all temperature transducers at a given time to reduce power consumption. When any one of the activated temperature transducers senses a temperature within a preset range of temperature, the screen of the terminal may be switched from the off state to an on state. Alternatively or additionally, when the sensed temperature is within the preset range of temperature, the terminal may activate at least one biometric sensor at the same time to obtain biometric inputs from the user. Here, the biometric sensor may include a fingerprint sensor, a microphone, or any other sensor.

In order to make a purpose, technical solutions and advantages of the embodiments of the present disclosure clearer, the embodiments of the present disclosure will be further described below with reference to the accompany drawings in detail. It is apparent that the described embodiments are not all embodiments but only a part of embodiments of the present disclosure. All other embodiments obtained by those skilled in the art on the basis of the embodiments in the present disclosure without creative work shall fall within the scope of protection of the present disclosure.

FIG. 1 is a flow chart showing a method for waking up a screen, according to an exemplary embodiment, and the method for waking up a screen may include the following steps.

In Step 101, when the screen is in an off state, a terminal activates at least one temperature transducer according to a predetermined sequence. The terminal may include a screen and a frame at least partially surrounding the screen, where the at least one temperature transducer is disposed at least partially in the frame. For example, the terminal may activate at least two groups of temperature transducers cyclically in a predetermined sequence, the at least two groups of temperature transducers being obtained by dividing at least two temperature transducers arranged in a frame of a terminal and each group of temperature transducers including at least one temperature transducer. Here, the predetermined sequence may select a subset of the temperature transducers at a given time point. The terminal may store at least one predetermined sequence for a terminal to use. The terminal may use the predetermined sequence to activate the subset of temperature transducers when the terminal is in an energy-saving mode.

In Step 102, the terminal obtains a temperature measurement through the activated temperature transducer. For example, the terminal may perform temperature sensing through the activated one or more temperature transducers.

In Step 103, when the temperature measurement is within a preset range of temperature, the terminal triggers the screen to be switched from the off state to an on state. For example, when any one of the activated temperature transducers senses temperature within a preset range of temperature of a human body, the screen is triggered to be switched from the off state to an on state.

From the above, according to the method for waking up a screen provided by the embodiment of the present disclosure, the at least two groups of temperature transducers may be cyclically activated in the predetermined sequence when the screen is in the off state, temperature sensing may be performed through the activated temperature transducers. Thus, one of the advantages provided by the disclosure is that not all of the temperature transducers are required to be activated at the same time to effectively reduce power consumption of the terminal. Further, the terminal may only activate one or more biometric sensors when the temperature measurement is within a preset range of temperature, For example, the terminal may turn on the fingerprint sensor when the temperature is within the preset range of temperature. Furthermore, the terminal may determine whether to turn on the screen based on multiple factors which include the temperature measurement from the activated temperature transducer and other measurements from one or more of the other sensors.

FIG. 2A is a flow chart showing another method for waking up a screen, according to an exemplary embodiment, and the method for waking up a screen may include the following steps.

In Step 201, a terminal divides at least two temperature transducers arranged in a frame of the terminal into at least two groups of temperature transducers. Each group of temperature transducers includes at least one temperature transducer.

A temperature transducer refers to a transducer capable of sensing temperature and converting the temperature into an available output signal. In the embodiment of the present disclosure, the state that the temperature transducers are arranged in the frame of the terminal refers to the state that the temperature transducers are arranged on an inner side of the frame, or are embedded into an inner frame, and the temperature transducers may be electrically connected with a processing unit of the terminal, and transmit electrical signals to the processing unit when sensing temperature. The processing unit may be a Central Processing Unit (CPU) or an Integrated Circuit (IC) such as a touch IC.

In the embodiment of the present disclosure, the at least two temperature transducers arranged in the frame of the terminal may be all of the temperature transducers arranged in the frame of the terminal and may also be a part of temperature transducers arranged in the frame of the terminal, which is not limited in the embodiments of the present disclosure. Generally, the at least two temperature transducers arranged in the frame of the terminal are all of the temperature transducers arranged in the frame of the terminal.

FIG. 2B is a schematic view of a structure of a terminal 200, according to an exemplary embodiment. As shown in FIG. 2B, the terminal 200 includes a screen 220 at least partially surrounded by a frame 210. The terminal 200 may include at least one temperature transducer at least partially disposed in the frame 210. For example, there are at least two temperature transducers 00 are arranged in the frame 210 of the terminal. The frame 210 may include a plurality of side frames. For example, a plurality of temperature transducers 00 are arranged in a left frame 212 and right frame 214 of the terminal respectively, wherein the numbers of the temperature transducers arranged in the left frame 212 and the right frame 214 may be the same or different, and there are no limits in the embodiment of the present disclosure. It is to be noted that a left side and right side of the terminal refer to two ends of a scanning direction along grid line of a display screen of the terminal. Note that the frame 210 may be a continuous frame that surrounds four sides of the terminal.

In practical application, there are various methods for the terminal to divide the at least two temperature transducers arranged in the frame of the terminal into the at least two groups of temperature transducers, and schematic descriptions will be made according to the following four aspects in the embodiments of the present disclosure.

Figure 2C:
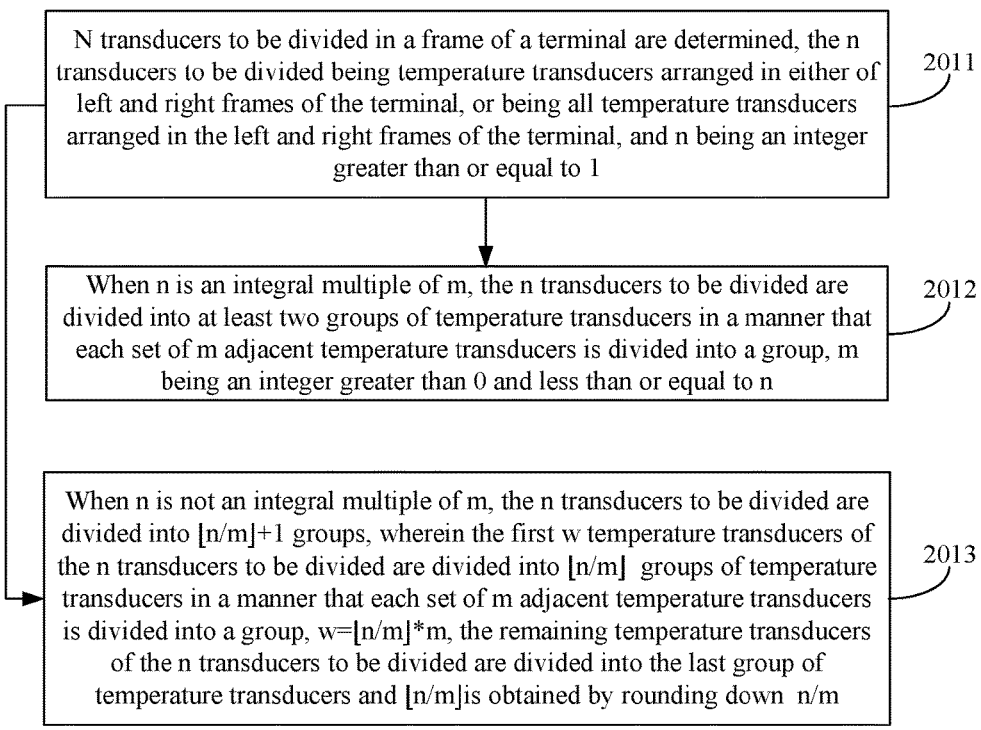
FIG. 2C is a flow chart showing a method for a terminal to divide at least two temperature transducers arranged in a frame of the terminal into at least two groups of temperature transducers, according to an exemplary embodiment.

According to a first aspect, FIG. 2C is a flow chart showing a method for a terminal to divide at least two temperature transducers arranged in a frame of the terminal into at least two groups of temperature transducers, according to an exemplary embodiment, and the method includes the following steps.

In Step 2011, n transducers to be divided in the frame of the terminal are determined. The n transducers to be divided is temperature transducers arranged in either of left and right frames of the terminal, or all of the temperature transducers arranged in the left and right frames of the terminal, and n is an integer greater than or equal to 1.

In the embodiment of the present disclosure, all of the temperature transducers arranged in the left and right frames of the terminal may be divided, or a part of temperature transducers in the left and right frames of the terminal may also be divided. Therefore, the terminal is required to determine the transducers to be divided at first. It is assumed that there are n transducers to be divided, the n transducers to be divided are temperature transducers arranged in either of the left and right frames of the terminal, or all of the temperature transducers arranged in the left and right frames of the terminal, and n is an integer greater than or equal to 1.

In Step 2012, when n is an integral multiple of m, the n transducers to be divided are divided into at least two groups of temperature transducers in a manner that each set of m adjacent temperature transducers is divided into a group. m is an integer greater than 0 and less than or equal to n.

It is to be noted that when the n transducers to be divided are the temperature transducers arranged in either of the left and right frames of the terminal, a sequence in which the n transducers to be divided are divided into the at least two groups of temperature transducers in the manner that each set of m adjacent temperature transducers is divided into a group may be a top-down sequence or a bottom-up sequence, which will not be limited in the embodiment of the present disclosure. When the n transducers to be divided are all of the temperature transducers arranged in the left and right frames of the terminal, the sequence in which the n transducers to be divided are divided into the at least two groups of temperature transducers in the manner that each set of m adjacent temperature transducers is divided into a group may be a clockwise sequence or a counterclockwise sequence, which will not be limited in the embodiment of the present disclosure.

Figure 2D:
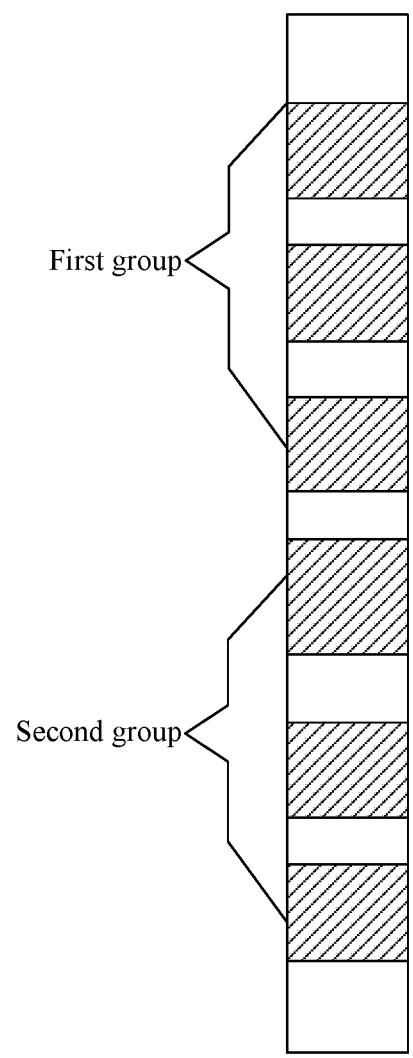
FIG. 2D is a schematic view of dividing temperature transducers in a frame, according to an exemplary embodiment.
Figure 2E:
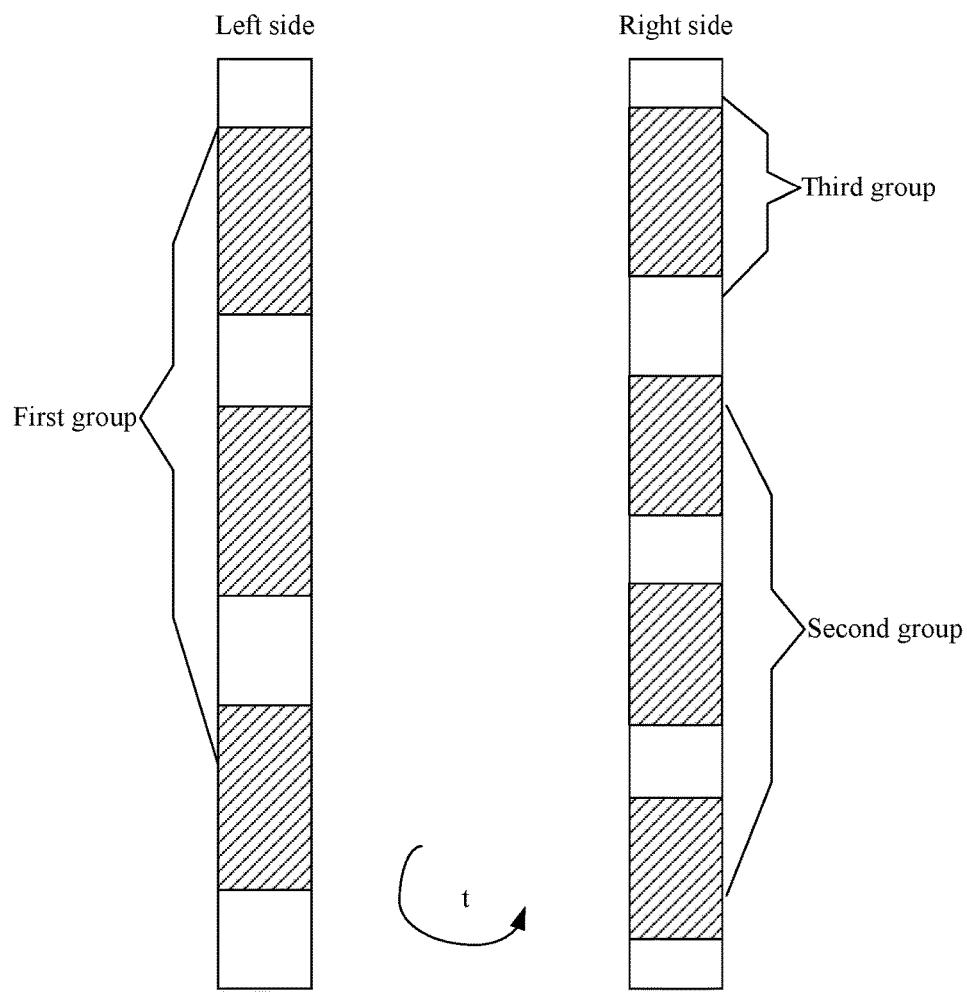
FIG. 2E is another schematic view of dividing temperature transducers in a frame, according to an exemplary embodiment.

Exemplarily, the n transducers to be divided are temperature transducers arranged in either of the left and right frames of the terminal. Assuming n=6 and m=3, two groups of temperature transducers are divided in each frame in a manner that each set of 3 adjacent temperature transducers are divided into a group. FIG. 2D is a schematic view of dividing temperature transducers in a frame, according to an exemplary embodiment. FIG. 2D is any one of the left and right frames. FIG. 2E shows an example of dividing the temperature transducers in the top-down sequence, and the temperature transducers in the frame are divided into two groups, i.e. first group and second group, of temperature transducers.

In Step 2013, when n is not an integral multiple of m, the n transducers to be divided are divided into $\lfloor n/m \rfloor+1$ groups. The first w temperature transducers of the n transducers to be divided are divided into $\lfloor n/m \rfloor$ groups of temperature transducers in a manner that each set of m adjacent temperature transducers is divided into a group, $w=\lfloor n/m \rfloor*m$, the remaining temperature transducers of the n transducers to be divided are divided into the last group of temperature transducers and $\lfloor n/m \rfloor$ is obtained by rounding down n/m.

Exemplarily, the n transducers to be divided are all of the temperature transducers arranged in the left and right frames of the terminal. Assuming n=7 and m=3, where $\lfloor 7/3 \rfloor=2$ and w=2*m=6. As shown in FIG. 2E which is another schematic view of dividing temperature transducers arranged in frames according to an exemplary embodiment, all of the temperature transducers arranged in both the left and right frames are shown. FIG. 2E shows an example of dividing the temperature transducers in the counterclockwise sequence t. The first 6 temperature transducers in the temperature transducers arranged in the frame of the left and right frames are divided into two groups of temperature transducers, i.e. a first group and second group of temperature transducers, in a manner that each set of 3 adjacent temperature transducers are divided into a group. That is, the temperature transducer except the first 6 temperature transducers among the 7 temperature transducers, i.e. the last temperature transducer in the frame shown in FIG. 2E, is divided into the last group of temperature transducer, i.e. a third group of temperature transducer.

It is to be noted that in the embodiment of the present disclosure, when the n transducers to be divided are the temperature transducers arranged in either of the left and right frames of the terminal, the temperature transducers arranged in each of the left and right frames may be divided by using a division method provided in Step 2012 or Step 2013. For example, the temperature transducers arranged in the left frame and the right frame are divided to obtain two groups of temperature transducers by using the division method provided in Step 2012 or Step 2013, and then there are four groups of temperature transducers in the terminal.

Figure 2F:
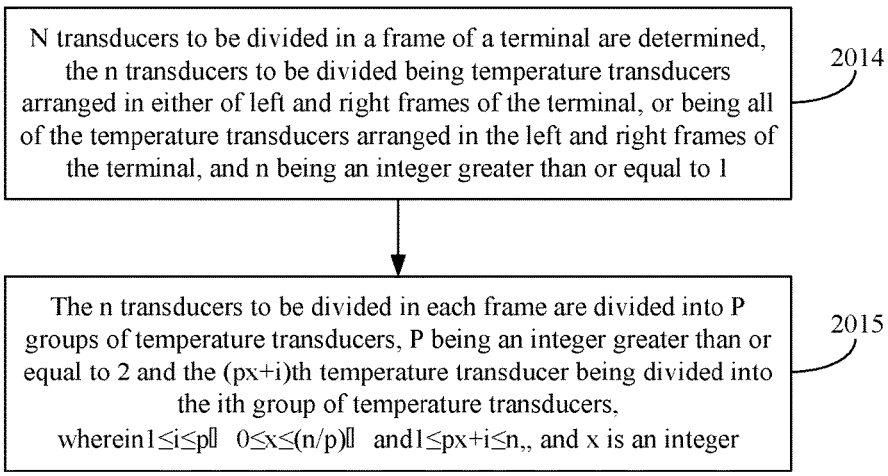
FIG. 2F is a flow chart showing a method for a terminal to divide at least two temperature transducers arranged in a frame of the terminal into at least two groups of temperature transducers, according to an exemplary embodiment.

According to a second aspect, FIG. 2F is a flow chart showing a method for a terminal to divide at least two temperature transducers arranged in a frame of the terminal into at least two groups of temperature transducers, according to an exemplary embodiment, and the method includes the following steps.

In Step 2014, n transducers to be divided in the frame of the terminal are determined. The n transducers to be divided is temperature transducers arranged in either of the left and right frames of the terminal, or all of the temperature transducers arranged in the left and right frames of the terminal, and n is an integer greater than or equal to 1.

Step 2014 may be similar to Step 2011, and will not be elaborated in the embodiment of the present disclosure.

In Step 2015, the n transducers to be divided in each frame are divided into P groups of temperature transducers. P is an integer greater than or equal to 2, and the (px+i)th temperature transducer is divided into the ith group of temperature transducers, wherein $1 \leq i \leq p$, $0 \leq x \leq (n/p)$ and $1 \leq px+i \leq n$, and x is an integer.

It is to be noted that when the n transducers to be divided are temperature transducers arranged in either of the left and right frames of the terminal, a sequence in which the n transducers to be divided are divided in Step 2015 may be a top-down sequence or a bottom-up sequence, which will not be limited in the embodiment of the present disclosure. When the n transducers to be divided are all of the temperature transducers arranged in the left and right frames of the terminal, the sequence in which the n transducers to be divided are divided in Step 2015 may be a clockwise sequence or a counterclockwise sequence, which will not be limited in the embodiment of the present disclosure.

Figure 2G:
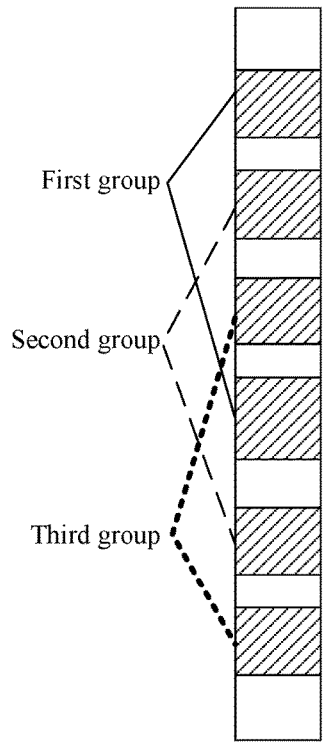
FIG. 2G is another schematic view of dividing temperature transducers in a frame, according to an exemplary embodiment.

When n is an integral multiple of p, positions of two adjacent temperature transducers in the same group of temperature transducers on the frame of the terminal are spaced by P−1 temperature transducers. Exemplarily, when the n transducers to be divided are temperature transducers arranged in either of the left and right frames of the terminal, assuming n=6 and p=3, the 6 temperature transducers in each frame are divided into three groups of temperature transducers, as shown in FIG. 2G FIG. 2G is another schematic view of dividing temperature transducers in a frame, according to an exemplary embodiment. FIG. 2G shows either of the left and right frames, the temperature transducers in the frame are divided into three groups, i.e. a first group, a second group and a third group, of temperature transducers. The (3x+i)th temperature transducer is divided into the ith group of temperature transducers, $1 \leq i \leq 3$, $0 \leq x \leq 2$ and $1 \leq 3x+i \leq 6$. For example, the first and fourth temperature transducers are divided into the first group of temperature transducers, the second and fifth temperature transducers are divided into the second group of temperature transducers, the third and sixth temperature transducers are divided into the third group of temperature transducers. Positions of two adjacent temperature transducers on the frame of the terminal in the same group of temperature transducers are spaced by 2 temperature transducers.

When n is not an integral multiple of p, for example, when the n transducers to be divided are temperature transducers arranged in either of the left and right frames of the terminal, assuming n=7 and p=3, the 7 temperature transducers in each frame are divided into three groups of temperature transducers, and as shown in FIG. 2H. FIG. 2H is another schematic view of dividing temperature transducers in a frame, according to an exemplary embodiment and shows either of the left and right frames. The temperature transducers in the frame are divided into three groups, i.e. a first group, a second group and a third group, of temperature transducers. The (3x+i)th temperature transducer is divided into the ith group of temperature transducers, $1 \leq i \leq 3$, $0 \leq x \leq 2$ and $1 \leq 3x+i \leq 7$. For example, the first, fourth and seventh temperature transducers are divided into the first group of temperature transducers, the second and fifth temperature transducers are divided into the second group of temperature transducers, and the third and sixth temperature transducers are divided into the third group of temperature transducers.

It is to be noted that in the embodiment of the present disclosure, when the n transducers to be divided are temperature transducers arranged in either of the left and right frames of the terminal, the temperature transducers arranged in each of the left and right frames may be divided by using the division method provided in Step 2012 or Step 2013. For example, the temperature transducers arranged in the left frame and the right frame are divided to two groups of temperature transducers by using the division method provided in Step 2012 or Step 2013, and there are four groups of temperature transducers in the terminal.

When the n transducers to be divided are all of the temperature transducers arranged in the left and right frames of the terminal, for a specific division process, please refer to the abovementioned examples, and the specific division process will not be elaborated in the present disclosure.

According to a third aspect, FIG. 2I is a flow chart showing a method for a terminal to divide at least two temperature transducers arranged in a frame of the terminal into at least two groups of temperature transducers, according to an exemplary embodiment, and the method includes the following steps.

In Step 2016, when the screen is in an off state within a preset period of time, each of the temperature transducers arranged in the frame of the terminal is activated, wherein the off state occurs for at least one time within the preset period of time.

Exemplarily, the preset period of time may be one day or a few hours. If the screen is in the off state within the preset period of time, all of the temperature transducers in the frame are activated in a turning-off process.

In Step 2017, a number of times for which each of the temperature transducers senses temperature within the preset range of temperature of a human body within the preset period of time are counted.

Figure 2J:
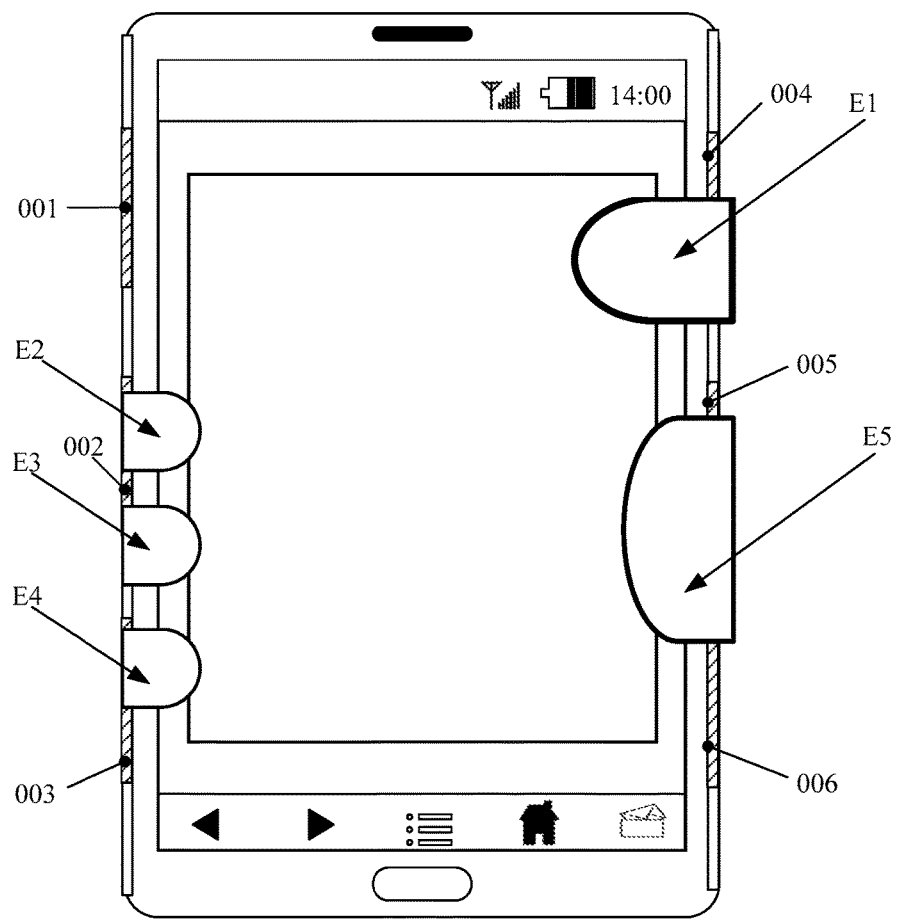
FIG. 2J is a schematic view of a structure of a terminal, according to an exemplary embodiment.

Exemplarily, it is assumed that there are totally 6 temperature transducers arranged in the frame of the terminal. FIG. 2J is a schematic view of a structure of a terminal, according to an exemplary embodiment. The temperature transducers in the frame of the terminal are denoted by numbers 001 to 006 respectively. Exemplarily, it is assumed that a habitual holding gesture of a user is a right-hand holding gesture in FIG. 2I, a touch area, corresponding to the right-hand holding gesture, on the terminal may include a thumb area E1, a forefinger area E2, a ring finger area E3, a little finger area E4 and a palm center area E5. The forefinger area E2, the ring finger area E3 and the little finger area E4 are usually formed at (the term "formed at" represents that the area may be detected at the corresponding position) positions corresponding to temperature transducers 002 and 003 in the left frame, the thumb area E1 is usually formed at a position corresponding to temperature transducer 004 in the right frame and the palm center area E5 is usually formed at a position corresponding to temperature transducers 005 and 006 in the right frame. Correspondingly, if a hand of the user touches the frame of the terminal for more times, the temperature transducer at the corresponding position senses human body temperature for more times. A number of times for which each temperature sensor senses temperature within the preset range of temperature of a human body within the preset period of time in FIG. 2J may be shown in Table 1, wherein the range of the temperature of the human body is preset, and when a temperature transducer detects temperature within the range of the temperature of the human body, the terminal determines that human body temperature is sensed. Exemplarily, the range of the temperature of the human body provided in the embodiment of the present disclosure usually refers to a range of temperature of a human hand, and may be 36~37° C.

TABLE 1

| Temperature transducer No. | Frame where temperature transducer is located | Number of times for which temperature within a preset range of temperature of a human body is sensed | Priority | Group |
|---|---|---|---|---|
| 001 | Left | 1 | Low | Group B |
| 002 | | 10 | High | Group A |

TABLE 1-continued

| Temperature transducer No. | Frame where temperature transducer is located | Number of times for which temperature within a preset range of temperature of a human body is sensed | Priority | Group |
|---|---|---|---|---|
| 003 | | 10 | High | Group A |
| 004 | Right | 2 | Low | Group B |
| 005 | | 7 | High | Group A |
| 006 | | 2 | low | Group B |

In Step 2018, the at least two temperature transducers arranged in the frame of the terminal are divided into at least two groups of temperature transducers with different priorities according to the number of times for which each of the temperature transducers senses temperature within the preset range of temperature of a human body. The priorities are directly proportional to the number of times for which the temperature transducers sense temperature within the preset range of temperature of a human body.

Exemplarily, at least one threshold value for the number of times may be set in the embodiment of the present disclosure, and the number of times for which each of the temperature transducers senses temperature within the preset range of temperature of a human body are compared with the at least one threshold value for the number of times to divide the at least two temperature transducers arranged in the frame of the terminal into the at least two groups of temperature transducers with different priorities.

Exemplarily, it is assumed that the frequency threshold value is 5, the number of times for which each of the temperature transducers senses temperature within the preset range of temperature of a human body are compared with 5 to divide the at least two temperature transducers arranged in the frame of the terminal into two groups, i.e. a group with high priority and a group with a low priority, of temperature transducers. It is assumed that the number of times for which each of the temperature transducers senses temperature within the preset range of temperature of a human body are shown in Table 1, the group with the high priority obtained by division is group A, the group with the low priority is group B, Referring to Table 1, group A includes temperature transducers 002, 003 and 005 and group B includes temperature transducers 001, 004 and 006.

Exemplarily, it is assumed that the threshold values 5 and 8 for the number of times are set. The number of times for which each of the temperature transducers senses temperature within the preset range of temperature of a human body is shown in Table 1. The temperature transducers may be divided into three groups of temperature transducers with high, middle and low priorities, The group of temperature transducers with high priority includes temperature transducers 002 and 003, the group of temperature transducers with middle priority includes temperature transducer 005, the group of temperature transducers with low priority includes temperature transducers 001, 004 and 006, and the result of the division is not shown in Table 1.

It is to be noted that the division method in Step 2015 is only a schematic description, and in a practical application, the at least two temperature transducers arranged in the frame of the terminal may be divided into at least two groups of temperature transducers with different priorities in another manner, according to the number of times for which each of the temperature transducers senses temperature within the preset range of temperature of a human body, which will not be elaborated in the embodiment of the present disclosure.

Since each user may hold the terminal in different manners, the temperature transducers are grouped in the manner provided in the third aspect in the embodiment of the present disclosure to effectively combine a personal holding habit of the user with the grouping manner to ensure accuracy of the subsequent process for sensing the temperature.

In a fourth aspect, the method for the terminal to divide the at least two temperature transducers arranged in the frame of the terminal into the at least two groups of temperature transducers may further include:

the at least two temperature transducers arranged in the frame of the terminal are divided into at least two groups of temperature transducers by using a quadrant division algorithm.

In the embodiment of the present disclosure, there may be multiple quadrant division algorithms, and a quadrant division algorithm in the related technology may specifically be referred to, which will not be limited in the embodiment of the present disclosure.

It is to be noted that the temperature transducers may not be divided by the terminal in practical application, and instead, the temperature transducers are be pre-divided according to a structure of the terminal by other processing equipment, then the result of the division is configured in the terminal, and the terminal directly acquires the statically configured division result and performs activatioin of the group of temperature transducers according to the result of the division. For a temperature transducer division method for the other processing equipment, please refer to Step 201, and the temperature transducer division method will not be limited in the embodiment of the present disclosure.

In Step 202, when the screen is in the off state, the terminal cyclically activates the at least two groups of temperature transducers in a predetermined sequence.

In practical application, there may be multiple methods for the terminal to cyclically activate the at least two groups of temperature transducers in the predetermined sequence, as long as all of the temperature transducers in the frame of the terminal are ensured not to be activated at the same time. Schematic explanation will be made with reference to the following two possible implementations in the embodiments of the present disclosure.

In a first possible implementation, when the temperature transducers are grouped, the division method provided in the third aspect in Step 201 is adopted, and accordingly, the step that the at least two groups of temperature transducers are cyclically activated in the predetermined sequence includes:

the at least two groups of temperature transducers are cyclically activated according to the priorities of the at least two groups of temperature transducers in the predetermined sequence, wherein a period of time during which each group of the at least two groups of the temperature transducers is kept activated is directly proportional to the priority.

Exemplarily, it is assumed that the division method provided by the third aspect is adopted and the temperature transducers are divided into group A and group B in Table 1, the temperature transducers in group A and group B are cyclically activated, and the duration in which the temperature transducers in group A with a high priority are kept activated is greater than the duration in which the temperature transducers in group B are kept activated.

In practical application, the same basis duration for activation may be set for the at least two divided groups of temperature transducers. For example, the basic duration for activation may be 0.5 s (second). Priority weights are then configured for each of the temperature transducers group according to the priorities of the at least two groups of temperature transducers, and products of a basic priority and the weights of priorities of each group of the temperature transducers are determined as an actual duration in which each of the temperature transducers is kept activated. Exemplarily, an actual duration Mi in which any temperature transducer group i is kept activated meets Ti*Ri=Mi, wherein Ti represents a basic duration in which any temperature transducer group i is kept activated and Ri represents a weight of a priority of any temperature transducer group i.

In the embodiment of the present disclosure, the weights of priorities are configured for each of the temperature transducers by querying a preset corresponding relationship between a priority and a weight. By using the cyclic activation method provided by the first possible implementation, the duration in which the temperature transducers are kept activated can be combined with the personal holding habit of the user. If the user touches the screen for more times, the number of times for which the temperature transducers sense human body temperature are higher and the duration in which the temperature sensors is kept activated are greater. As such, power consumption of the terminal is effectively reduced while accuracy in sensing temperature is ensured.

In a second possible implementation, when the temperature transducers are grouped, the division methods provided by the first, second and fourth aspects in Step 201 are adopted, and the step that the at least two groups of temperature transducers are cyclically activated in the predetermined sequence includes: the at least two groups of temperature transducers are cyclically activated in the predetermined sequence by using a time polling algorithm.

In the embodiment of the present disclosure, the time polling algorithm refers to an algorithm of sequentially triggering the temperature transducers to be activated according to a preset period of time, and cyclically activating the at least two groups of temperature transducers in the predetermined sequence by using the time polling algorithm practically refers to sequentially and cyclically activating the at least two groups of temperature transducers in the predetermined sequence by using the same activating period which may be for example 0.5 s.

It is to be noted that the terminal may update the result of the division of the temperature transducers in practical application. For example, the terminal may count the number of times for which each activated temperature transducer senses temperature within the preset range of temperature of a human body within the preset period of time, wherein the off state occurs for at least one time within the preset period of time. Then, the at least two temperature transducers arranged in the frame of the terminal are divided into at least two groups of temperature transducers with different priorities according to the number of times for which each activated temperature transducer senses temperature within the preset range of temperature of a human body. The priorities is directly proportional to the number of times for which the temperature transducers sense temperature within the preset range of temperature of a human body. Then, the at least two groups of temperature transducers are cyclically activated according to the priorities of the at least two groups of temperature transducers, wherein the priorities are directly proportional to the duration in which the temperature transducers is kept activated. The activated temperature transducers refer to temperature transducers activated according to the result of division obtained in Step 202. For specific process of updating the result of division, please refer to the third aspect of Step 201, and the specific process will not be elaborated in the embodiment of the present disclosure.

In Step 203, the terminal performs temperature sensing through the activated temperature transducers.

In the embodiment of the present disclosure, the temperature transducers in the frame of the terminal are not activated at the same time, and the terminal performs temperature sensing through the activated temperature transducers.

In Step 204, when any one of the activated temperature transducers senses temperature within the preset range of temperature of a human body, the terminal triggers the screen to be switched from the off state to an on state.

In Step 205, the terminal receives information input by the user through the screen in the on state.

The information input by the user may be a gesture, a password, a trajectory or the like, which will not be limited in the embodiment of the present disclosure.

The predetermined sequence in the embodiment of the present disclosure may be statically preconfigured in the terminal, or may be a sequence such as a clockwise sequence, a counterclockwise sequence, a top-down sequence or a bottom-up sequence, which will not be limited in the embodiment of the present disclosure.

It is to be noted that a sequence of the steps of the method for waking up a screen provided by the embodiment of the present disclosure may be properly adjusted, the steps may also be added or reduced according to a specific situation, and any method which is easily conceived by those skilled in the art within the technical scope of the embodiments of the present disclosure shall fall within the scope of protection of the embodiments of the present disclosure and will be elaborated.

As can be seen from the above, according to the method for waking up a screen provided by the embodiment of the present disclosure, the at least two groups of temperature transducers are cyclically activated in the predetermined sequence when the screen is in the off state, temperature sensing is performed through the activated temperature transducers. Thus, one of the advantages by the present disclosure is that not all of the temperature transducers are required to be activated at the same time to effectively reduce power consumption of the terminal.

Figure 3A:
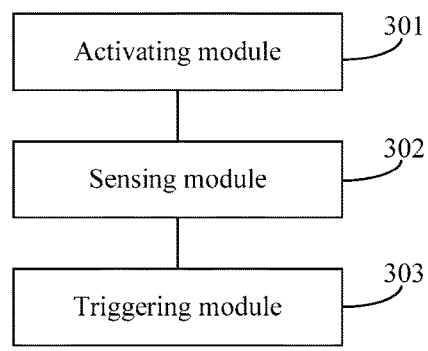
FIG. 3A is a block diagram of a device for waking up a screen, according to an exemplary embodiment.

FIG. 3A is a block diagram of a device for waking up a screen, according to an exemplary embodiment, the device is configured for a terminal which may be a mobile phone, a pad and the like. The device includes an activating module 301, a sensing module 302 and a triggering module 303.

The activating module 301 is configured to, when the screen is in an off state, cyclically activate at least two groups of temperature transducers in a predetermined sequence. The at least two groups of temperature transducers is obtained by dividing at least two temperature transducers arranged in a frame of a terminal and each group of temperature transducers includes at least one temperature transducer.

The sensing module 302 is configured to perform temperature sensing through the activated temperature transducers.

The triggering module 303 is configured to, when any one of the activated temperature transducers senses temperature within a preset range of temperature of a human body, trigger the screen to be switched from the off state to an on state.

From the above, according to the device for waking up a screen provided by the embodiment of the present disclosure, the activating module may cyclically activate the at least two groups of temperature transducers in the predetermined sequence when the screen is in the off state, the sensing module may perform temperature sensing through the activated temperature transducers. Thus, one of the advantages provided by the present disclosure is that not all of the temperature transducers are required to be activated at the same time to effectively reduce power consumption of the terminal.

Figure 3B:
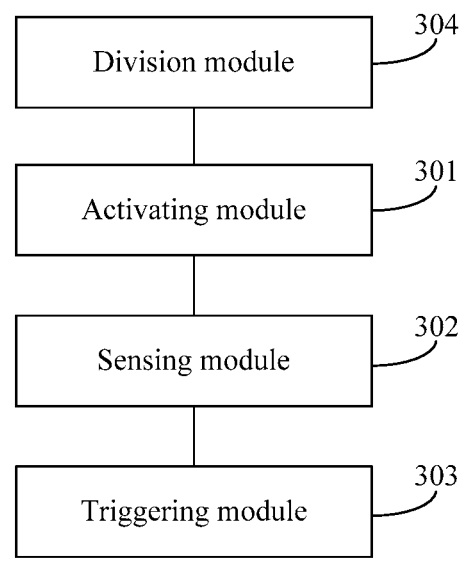
FIG. 3B is a block diagram of another device for waking up a screen, according to an exemplary embodiment.

FIG. 3B is a block diagram of another device for waking up a screen, according to an exemplary embodiment, and the device is configured for a terminal, and includes an activating module 301, a sensing module 302, a triggering module 303 and a division module 304.

The activating module 301 is configured to, when the screen is in an off state, cyclically activate at least two groups of temperature transducers in a predetermined sequence. The at least two groups of temperature transducers is obtained by dividing at least two temperature transducers arranged in a frame of a terminal and each group of temperature transducers includes at least one temperature transducer.

The sensing module 302 is configured to perform temperature sensing through the activated temperature transducers.

The triggering module 303 is configured to, when any one of the activated temperature transducers senses temperature within a preset range of temperature of a human body, trigger the screen to be switched from the off state to an on state.

The division module 304 is configured to divide the at least two temperature transducers arranged in the frame of the terminal into the at least two groups of temperature sensors.

Optionally, the division module 304 is configured to:

determine n transducers to be divided in the frame of the terminal, the n transducers to be divided being temperature transducers arranged in either of left and right frames of the terminal, or all temperature transducers arranged in the left and right frames of the terminal, and n being an integer greater than or equal to 1;

when n is an integral multiple of m, divide the n transducers to be divided into at least two groups of temperature transducers in a manner that each set of m adjacent temperature transducers is divided into a group, m being an integer greater than 0 and less than or equal to n; and when n is not an integral multiple of m, divide the n transducers to be divided into $\lfloor n/m \rfloor+1$ groups, wherein the first w temperature transducers of then transducers to be divided may be divided into $\lfloor n/m \rfloor$ groups of temperature transducers in a manner that each set of m adjacent temperature transducers is divided into a group, $w=\lfloor n/m \rfloor*m$, the remaining temperature transducers of the n transducers to be divided may be divided into the last group of temperature transducers and $\lfloor n/m \rfloor$ may represent rounding down n/m.

Optionally, the division module 304 is configured to:

determine n transducers to be divided in the frame of the terminal, the n transducers to be divided being temperature transducers arranged in either of the left and right frames of the terminal, or all of the temperature transducers arranged in the left and right frames of the terminal, and n being an integer greater than or equal to 1; and divide the n transducers to be divided into P groups of temperature transducers, P being an integer greater than or equal to 2 and the (px+i)th temperature transducer being divided into the ith group of temperature transducers, wherein $1 \le i \le p$, $0 \le x \le (n/p)$ and $1 \le px+i \le n$, and x is an integer.

Optionally, the division module 304 is configured to:

divide the at least two temperature transducers arranged in the frame of the terminal into the at least two groups of temperature transducers by using a quadrant division algorithm.

Optionally, the division module 304 is configured to:

when the screen is in the off state within a preset period of time, activate each of the temperature transducers arranged in the frame of the terminal, wherein the off state occurs for at least one time within the preset period of time;

count a number of times for which each of the temperature transducers senses temperature within the preset range of temperature of a human body within the preset period of time; and divide the at least two temperature transducers arranged in the frame of the terminal into at least two groups of temperature transducers with different priorities according to the number of times for which each of the temperature transducers senses temperature within the preset range of temperature of a human body, the priorities being directly proportional to the number of times for which the temperature transducers sense temperature within the preset range of temperature of a human body.

The activating module 301 is configured to: cyclically activate the at least two groups of temperature transducers according to the priorities of the at least two groups of temperature transducers in the predetermined sequence. The duration in which the temperature transducers is kept activated may be directly proportional to the priorities.

Optionally, the activating module 301 is configured to:

cyclically activate the at least two groups of temperature transducers in the predetermined sequence by using a time polling algorithm.

From the above, according to the device for waking up a screen provided by the embodiment of the present disclosure, the activating module may cyclically activate the at least two groups of temperature transducers in the predetermined sequence when the screen is in the off state, the sensing module may perform temperature sensing through the activated temperature transducers. Thus, not all of the temperature transducers are required to be activated at the same time to effectively reduce power consumption of the terminal.

The embodiment of the present disclosure provides a device for waking up a screen, which is configured for a terminal, the terminal including:

a frame comprising at least one temperature transducer;

a screen at least partially surrounded by the frame;

a processor at least partially surrounded by the frame; and a memory configured to store instructions executable by the processor, wherein the processor is configured to:

when the screen is in an off state, cyclically activate at least two groups of temperature transducers in a predetermined sequence, the at least two groups of temperature transducers being obtained by dividing at least two temperature transducers arranged in a frame of a terminal and each group of temperature transducers including at least one temperature transducer;

perform temperature sensing through the activated temperature transducers; and when any one of the activated temperature transducers senses temperature within a preset range of temperature of a human body, send an instruction to trigger the screen to be switched from the off state to an on state.

Figure 4:
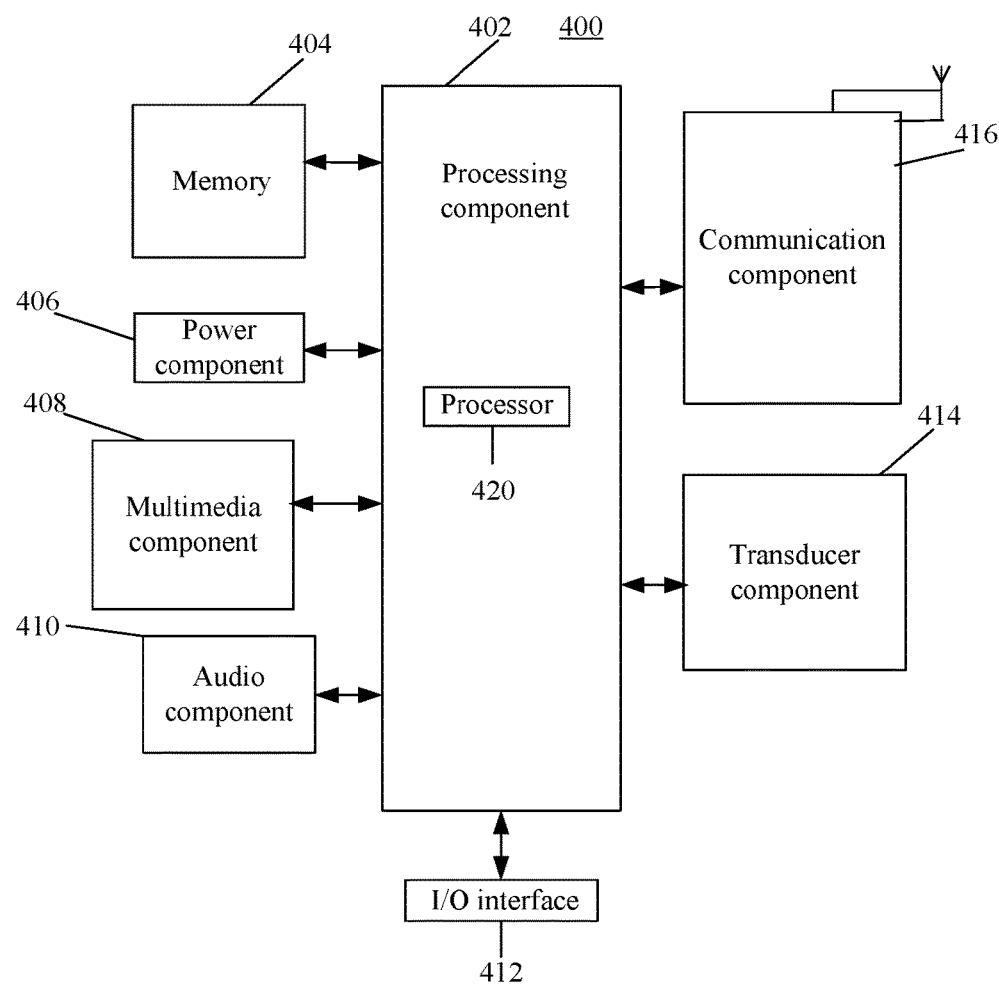
FIG. 4 is a block diagram of another device for waking up a screen, according to an exemplary embodiment.

FIG. 4 is a block diagram of another wakeup device 400 for a terminal, according to an exemplary embodiment. For example, the device 400 may be a mobile phone, a computer, a digital broadcast terminal, a messaging device, a gaming console, a tablet, a medical device, exercise equipment, a personal digital assistant and the like.

Referring to FIG. 4, the device 400 may include one or more of: a processing component 402, a memory 404, a power component 406, a multimedia component 408, an audio component 410, an Input/Output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 420 to execute instructions to perform all or part of the steps in the abovementioned method. Moreover, the processing component 402 may include one or more modules which facilitate interaction between the processing component 402 and the other components. For instance, the processing component 402 may include a multimedia module to facilitate interaction between the multimedia component 408 and the processing component 402.

The memory 404 is configured to store various types of data to support the operation of the device 400. Examples of such data include instructions for any application programs or methods operated on the device 400, contact data, phonebook data, messages, pictures, video, etc. The memory 404 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 406 provides power for various components of the device 400. The power component 406 may include a power management system, one or more power supplies, and other components associated with the generation, management and distribution of power for the device 400.

The multimedia component 408 includes a screen providing an output interface between the device 400 and a user. In some embodiments, the screen may be a Liquid Crystal Display (LCD) or a Touch Panel (TP). If the screen is the TP, the screen may be implemented as a screen for receiving an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 408 includes a front camera and/or a rear camera. The front camera and/or the rear camera may receive external multimedia data when the device 400 is in an operation mode, such as a photographing mode or a video mode. Each of the front camera and the rear camera may be a fixed optical lens system or have focusing and optical zooming capabilities.

The audio component 410 is configured to output and/or input an audio signal. For example, the audio component 410 includes a Microphone (MIC) which is configured to receive an external audio signal when the device 400 is in the operation mode, such as a call mode, a recording mode and a voice recognition mode. The received audio signal may be further stored in the memory 404 or sent through the communication component 416. In some embodiments, the audio component 410 further includes a speaker configured to output the audio signal.

The I/O interface 412 provides an interface between the processing component 402 and a peripheral interface module. The peripheral interface module may be a keyboard, a click wheel, a button or the like. The button may include, but not limited to, a home button, a volume button, an activating button and a locking button.

The sensor component 414 includes one or more sensors configured to provide assessment of status in various aspects for the device 400. For instance, the sensor component 414 may detect an on/off status of the device 400 and relative positioning of components, such as a display and keypad of the device 400, and the sensor component 414 may further detect a change in a position of the device 400 or a component of the device 400, presence or absence of contact between the user and the device 400, orientation or acceleration/deceleration of the device 400 and a change in temperature of the device 400. The sensor component 414 may include a proximity sensor configured to detect presence of an object nearby without any physical contact. The sensor component 414 may also include a light sensor, such as a Complementary Metal Oxide Semiconductor (CMOS) or Charge Coupled Device (CCD) image sensor, configured for use in an imaging application. In some embodiments, the sensor component 414 may also include an acceleration sensor, a gyroscope sensor, a magnetic sensor, a pressure sensor or a temperature sensor.

The communication component 416 is configured to facilitate wired or wireless communication between the device 400 and another device. The device 400 may access a communication-standard-based wireless network, such as a Wireless Fidelity (WiFi) network, a 2nd-Generation (2G) or 3rd-Generation (3G) network or a combination thereof. In an exemplary embodiment, the communication component 416 receives a broadcast signal or broadcast associated information from an external broadcast management system through a broadcast channel. In an exemplary embodiment, the communication component 416 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BlueTooth (BT) technology and another technology.

In an exemplary embodiment, the device 400 may be implemented by one or more circuitries, which include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components. The device 400 may use the circuitries in combination with the other hardware or software components for performing the above described methods. Each module, sub-module, unit, or sub-unit in the disclosure may be implemented at least partially using the one or more circuitries.

In an exemplary embodiment, there is also provided a non-transitory computer-readable storage medium containing instructions, such as the memory 404 containing instructions, and the instructions may be executed by the processor 420 of the device 400 to implement the abovementioned method. For example, the non-transitory computer-readable storage medium may be a ROM, a Compact Disc Read-Only Memory (CD-ROM), a magnetic tape, a floppy disc, an optical data storage device and the like. Further, each module or sub-module may include non-transitory memory (shared, dedicated, or group) that stores code or instructions that can be executed by one or more processors. The module or sub-module may take the form of a packaged functional hardware unit designed for use with other components, a portion of a program code (e.g., software or firmware) executable by the processor 420, one or more circuitries that usually perform a particular function of related functions, or a self-contained hardware or software component that interfaces with a larger system, for example.

According to a non-transitory computer-readable storage medium, when instructions in the storage medium are executed by the processor of the device 400, the device 400 may perform a method for waking up a screen provided by the embodiment of the present disclosure.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other implementations to the embodiments of the present disclosure will be easily conceived by those skilled in the art from consideration of the specification and practice of the present disclosure. This application is intended to cover any variations, uses, or adaptations of the embodiments of the present disclosure following the general principles of the embodiments of the present disclosure and including common knowledge or conventional technical means in the relevant art which is not disclosed by the embodiments of the present disclosure. It is intended that the specification and embodiments are considered as exemplary only, and a true scope and spirit of the embodiments of the present disclosure are indicated by the following claims.

It will be appreciated that the embodiments of the present disclosure are not limited to the exact construction that has been described above and illustrated in the accompanying drawings, and that various modifications and changes may be made without departing from the scope thereof. It is intended that the scope of the embodiments of the present disclosure is only limited by the appended claims.

What is claimed is:

1. A method, comprising:
    activating, by a terminal comprising a screen and a frame at least partially surrounding the screen, at least one temperature transducer according to a predetermined sequence when the screen is in an off state, the at least one temperature transducer being disposed at least partially in the frame;
    obtaining, by the terminal, a temperature measurement through the activated temperature transducer; and
    when the temperature measurement is within a preset range of temperature, triggering, by the terminal, the screen to be switched from the off state to an on state,
    wherein the at least one temperature transducer comprises at least two temperature transducers, the method further comprising:
    dividing the at least two temperature transducers in the frame of the terminal into at least two groups of temperature transducers; and
    cyclically activating, by the terminal, the at least two groups of temperature transducers according to the predetermined sequence.

2. The method according to claim 1, wherein dividing the at least two temperature transducers in the frame of the terminal into the at least two groups of temperature transducers comprises:
    determining n transducers to be divided in the frame of the terminal, the n transducers to be divided being temperature transducers arranged in either of left and right frames of the terminal, or all of temperature transducers arranged in the left and right frames of the terminal, and n being an integer greater than or equal to 1;
    when n is an integral multiple of m, dividing the n transducers to be divided into at least two groups of temperature transducers in a manner that each set of m adjacent temperature transducers is divided into a group, m being an integer greater than 0 and less than or equal to n; and
    when n is not an integral multiple of m, dividing the n transducers to be divided into $\lfloor n/m \rfloor+1$ groups, wherein the first w temperature transducers of the n transducers to be divided are divided into $\lfloor n/m \rfloor$ groups of temperature transducers in a manner that each set of m adjacent temperature transducers is divided into a group, $w = \lfloor n/m \rfloor * m$, the remaining temperature transducers of the n transducers to be divided are divided into the last group of temperature transducers and $\lfloor n/m \rfloor$ is obtained by rounding down n/m.

3. The method according to claim 1, wherein dividing the at least two temperature transducers in the frame of the terminal into the at least two groups of temperature transducers comprises:
    determining n transducers to be divided in the frame of the terminal, the n transducers to be divided being temperature transducers arranged in either of the left and right frames of the terminal, or all of temperature transducers arranged in the left and right frames of the terminal, and n being an integer greater than or equal to 1; and dividing the n transducers to be divided into P groups of temperature transducers, P being an integer greater than or equal to 2 and the (px+i)th temperature transducer being divided into the ith group of temperature transducers, wherein $1\leq i\leq p$, $0\leq x\leq(n/p)$ and $1\leq px+i\leq n$, and x is an integer.

4. The method according to claim 1, wherein dividing the at least two temperature transducers in the frame of the terminal into the at least two groups of temperature transducers comprises:

dividing the at least two temperature transducers arranged in the frame of the terminal into the at least two groups of temperature transducers by using a quadrant division algorithm.

5. The method according to claim 1, wherein dividing the at least two temperature transducers in the frame of the terminal into the at least two groups of temperature transducers comprises:

when the screen is in the off state within a preset period of time, activating each of the temperature transducers arranged in the frame of the terminal, wherein the off state occurs for at least one time within the preset period of time;

counting a number of times for which each of the temperature transducers senses temperature within the preset range of temperature of a human body within the preset period of time; and dividing the at least two temperature transducers arranged in the frame of the terminal into at least two groups of temperature transducers with different priorities according to the number of times for which each of the temperature transducers senses temperature within the preset range of temperature of the human body, the priorities being directly proportional to the number of times for which the temperature transducers sense temperature within the preset range of temperature of the human body.

6. The method according to claim 5, wherein cyclically activating the at least two groups of temperature transducers in the predetermined sequence comprises:

cyclically activating the at least two groups of temperature transducers according to the priorities of the at least two groups of temperature transducers in the predetermined sequence, wherein a period of time during which each group of the at least two groups of the temperature transducers is kept activated is directly proportional to the priority.

7. The method according to claim 1, wherein cyclically activating the at least two groups of temperature transducers in the predetermined sequence comprises:

cyclically activating the at least two groups of temperature transducers in the predetermined sequence by using a time polling algorithm.

8. A device, comprising:
a frame comprising at least one temperature transducer;
a screen at least partially surrounded by the frame;
a processor at least partially surrounded by the frame; and
a memory configured to store instructions executable by the processor,
wherein the processor is configured to:
activate the at least one temperature transducer in a predetermined sequence when the screen is in an off state;
obtain a temperature measurement through the activated temperature transducer; and when the temperature measurement is within a preset range of temperature, send an instruction to trigger the screen to be switched from the off state to an on state, wherein the at least one temperature transducer comprises at least two temperature transducers, and wherein the processor is further configured to:

divide the at least two temperature transducers in the frame of the terminal into at least two groups of temperature transducers; and cyclically activate the at least two groups of temperature transducers according to the predetermined sequence.

9. The device according to claim 8, wherein the processor is further configured to:

determine n transducers to be divided in the frame of the terminal, the n transducers to be divided being temperature transducers in either of left and right frames of the terminal, or all of temperature transducers in the left and right frames of the terminal, and n being an integer greater than or equal to 1;

when n is an integral multiple of m, divide the n transducers to be divided into at least two groups of temperature transducers in a manner that each set of m adjacent temperature transducers is divided into a group, m being an integer greater than 0 and less than or equal to n; and when n is not an integral multiple of m, divide the n transducers to be divided into $\lfloor n/m \rfloor+1$ groups, wherein the first w temperature transducers of the n transducers to be divided are divided into $\lfloor n/m \rfloor$ groups of temperature transducers in a manner that each set of m adjacent temperature transducers is divided into a group, $w = \lfloor n/m \rfloor * m$, the remaining temperature transducers of the n transducers to be divided are divided into the last group of temperature transducers and $\lfloor n/m \rfloor$ is obtained by rounding down n/m.

10. The device according to claim 8, wherein the processor is further configured to:

determine n transducers to be divided in the frame of the terminal, the n transducers to be divided being temperature transducers in either of the left and right frames of the terminal, or all of temperature transducers in the left and right frames of the terminal, and n being an integer greater than or equal to 1; and divide the n transducers to be divided into P groups of temperature transducers, P being an integer greater than or equal to 2 and the (px+i)th temperature transducer being divided into the ith group of temperature transducers, wherein $1\leq i\leq p$, $0\leq x\leq(n/p)$ and $1\leq px+i\leq n$, and x is an integer.

11. The device according to claim 8, wherein the processor is further configured to:

divide the at least two temperature transducers in the frame of the terminal into the at least two groups of temperature transducers by using a quadrant division algorithm.

12. The device according to claim 8, wherein the processor is further configured to:

when the screen is in the off state within a preset period of time, activate each of the temperature transducers in the frame of the terminal, wherein the off state occurs for at least one time within the preset period of time;

count a number of times for which each of the temperature transducers senses temperature within the preset range of temperature within the preset period of time; and divide the at least two temperature transducers in the frame of the terminal into at least two groups of temperature transducers with different priorities according to the number of times for which each of the temperature transducers senses temperature within the preset range of temperature, the priorities being directly proportional to the number of times for which the temperature transducers sense temperature within the preset range of temperature.

13. The device according to claim 12, wherein the processor is further configured to:
cyclically activate the at least two groups of temperature transducers according to the priorities of the at least two groups of temperature transducers in the predetermined sequence, wherein a period of time during which each group of the at least two groups of the temperature transducers is kept activated is directly proportional to the priority.

14. The device according to claim 8, wherein the processor is further configured to:
cyclically activate the at least two groups of temperature transducers in the predetermined sequence by using a time polling algorithm.

15. A non-transitory computer-readable storage medium having stored therein instructions that, when executed by a processor of a mobile terminal, causes the mobile terminal to perform acts comprising:
counting a number of times for which each of temperature transducers senses temperature within a preset range of temperature within a preset period of time;
dividing the temperature transducers in the frame of the terminal into at least two groups of temperature transducers with different priorities according to the number of times for which each of the temperature transducers senses temperature within the preset range of temperature;
when the screen is in an off state, cyclically activating the at least two groups of temperature transducers in a predetermined sequence, the at least two groups of temperature transducers are arranged in a frame of a terminal and each group of temperature transducers comprising at least one temperature transducer;
obtaining at least one temperature measurement through the activated temperature transducers; and
when the at least one temperature measurement is within the preset range of temperature, triggering the screen to be switched from the off state to an on state.

16. The non-transitory computer-readable storage medium according to claim 15, wherein
the priorities are directly proportional to the number of times for which the temperature transducers sense temperature within the preset range of temperature.

17. The non-transitory computer-readable storage medium according to claim 16, wherein the acts further comprise:
cyclically activating the at least two groups of temperature transducers according to the priorities of the at least two groups of temperature transducers in the predetermined sequence, wherein a period of time during which each group of the at least two groups of the temperature transducers is kept activated is directly proportional to the priority.

18. The non-transitory computer-readable storage medium according to claim 15, wherein the acts further comprise:
cyclically activating the at least two groups of temperature transducers in the predetermined sequence by using a time polling algorithm.

* * * * *